United States Patent
Hagirahim et al.

(10) Patent No.: US 7,054,327 B2
(45) Date of Patent: May 30, 2006

(54) METHOD OF PROVIDING QUALITY OF SERVICE (QOS) TO VOICE APPLICATIONS IN ROUTED IP NETWORKS

(75) Inventors: Hassan Hagirahim, Long Branch, NJ (US); Hanan M Novotny, Aberdeen, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 758 days.

(21) Appl. No.: 09/867,975

(22) Filed: May 30, 2001

(65) Prior Publication Data

US 2002/0181401 A1    Dec. 5, 2002

(51) Int. Cl.
*H04L 12/28* (2006.01)
(52) U.S. Cl. ...................... 370/410; 370/468
(58) Field of Classification Search ................ 370/468, 370/229, 230, 235, 236, 410, 401, 395.1, 370/395.2, 395.21, 395.3, 395.4, 395.41, 370/395.42
See application file for complete search history.

(56) References Cited

U.S. PATENT DOCUMENTS

| | | | | |
|---|---|---|---|---|
| 6,018,360 | A * | 1/2000 | Stewart et al. | 348/14.09 |
| 6,122,665 | A * | 9/2000 | Bar et al. | 709/224 |
| 6,363,065 | B1 * | 3/2002 | Thornton et al. | 370/352 |
| 6,680,922 | B1 * | 1/2004 | Jorgensen | 370/328 |
| 6,724,721 | B1 * | 4/2004 | Cheriton | 370/229 |
| 6,744,767 | B1 * | 6/2004 | Chiu et al. | 370/395.21 |
| 6,781,955 | B1 * | 8/2004 | Leung | 370/232 |
| 6,785,233 | B1 * | 8/2004 | Goyal et al. | 370/231 |
| 6,801,521 | B1 * | 10/2004 | Shaffer et al. | 370/352 |

* cited by examiner

Primary Examiner—Ajit Patel
Assistant Examiner—Andrew C Lee

(57) ABSTRACT

A simplified methodology for accomplishing traffic management in a packet based network is achieved by allowing allocation of bandwidth based on a count of the number of endpoint connections associated with a specific service for a corresponding network device. A network device (e.g., IP router) can be configured to count the number of TCP/IP and UDP/IP connections and bandwidth usage per interface. The counting can be done by identifying the IP Addresses, Type of Service (TOS), and TCP/UDP and/or UDP/IP socket number range in the IP Header of a packet and then querying a specific communication type. When reaching the maximum allowed connections or bandwidth for a specific service, the network device (e.g., IP router) stops forwarding any new calls by means of dropping packets of new calls and informing the given endpoints to disconnect the new calls. In one exemplary embodiment of the invention, a procedure for managing traffic flowing through individual routers of a packet network includes the steps of reserving a given amount of bandwidth on interfaces of the individual routers for specific types of communications traffic, periodically querying endpoint connections based on data from a corresponding router connection table, receiving responses from the periodic querying to determine a current connection status and bandwidth allocation of said endpoints and calculating current bandwidth allocation for a specific type communications service on an interface handled by the router. The router admits additional communications traffic for a specific type of communications service if bandwidth is available.

20 Claims, 3 Drawing Sheets

US 7,054,327 B2

METHOD OF PROVIDING QUALITY OF SERVICE (QOS) TO VOICE APPLICATIONS IN ROUTED IP NETWORKS

FIELD OF THE INVENTION

The present invention relates generally to the field of Internet Protocol (IP) networks, and more specifically to the field of providing Quality Of Service (QOS) within such networks.

BACKGROUND OF THE INVENTION

Routers in existing IP networks do not currently accommodate the reserving of bandwidth for traffic management purposes. Accordingly, a router has no up-to-date notion of what is occurring with its associated endpoints in terms of accepting new traffic. For instance, once certain VoIP traffic has been admitted, there is no easy way for the router to determine that the specific traffic is no longer continuing. Thus, packets are typically dropped if the router cannot handle the associated traffic. One possible solution to address this problem is to associate timers to the specific traffic for each connection on each of the links and monitor each call for activity. Such a methodology is extremely costly, however, in that multiple timers must be programmed into each router and tracked. Accordingly, there is a need for a simplified traffic management methodology for routers in IP networks.

SUMMARY OF THE INVENTION

A simplified methodology for accomplishing traffic management in a packet based network is achieved by allowing allocation of bandwidth based on a count of the number of endpoint connections associated with a specific service for a corresponding network device. A network device (e.g., IP router) can be configured to count the number of TCP/IP (Transmission Control Protocol/Internet Protocol) and/or UDP/IP (User Datagram Protocol/Internet Protocol) connections and bandwidth usage per interface. The counting can be done by identifying the IP Addresses, Type of Service (TOS), and TCP/UDP and/or UDP/IP socket number range in the IP Header of a packet and then querying a specific communication type. When reaching the maximum allowed connections or bandwidth for a specific service, the network device (e.g., IP router) stops forwarding any new calls by means of dropping packets of new calls and informing the given endpoints to disconnect the new calls.

In one exemplary embodiment of the invention, a procedure for managing traffic flowing through individual routers of a packet network includes the steps of reserving a given amount of bandwidth on interfaces of the individual routers for specific types of communications traffic, periodically querying endpoint connections based on data from a corresponding router connection table, receiving responses from the periodic querying to determine a current connection status and bandwidth allocation of said endpoints and calculating current bandwidth allocation for a specific type communications service on an interface handled by the router. The router admits additional communications traffic for a specific type of communications service if bandwidth is available.

BRIEF DESCRIPTION OF THE DRAWINGS

A more complete understanding of the present invention may be obtained from consideration of the following detailed description of the invention in conjunction with the drawing, with like elements referenced with like references, in which.

DETAILED DESCRIPTION

The present invention enables allocation and tracking of bandwidth based on a count of the number of specific types of connections, e.g., voice over IP calls, currently in existence. In accordance with the present invention, a network device (e.g., IP router) is configured to count the number of TCP/IP (Transmission Control Protocol/Internet Protocol) and/or UDP/IP (User Datagram Protocol/Internet Protocol) connections per interface. The counting is done by identifying the IP Addresses, Type of Service (TOS), and TCP/UDP and/or UDP/IP socket number range in the IP Header of a packet. A table in the router is populated based on the information provided by the count and the allocated bandwidth is totaled. When reaching the maximum allowed bandwidth that will be accommodated, the network device (e.g., IP router) stops forwarding any new calls. In an exemplary embodiment of the invention, this stoppage is accomplished by way of dropping packets of new calls and informing the given endpoints to disconnect the new calls.

Figure 1:
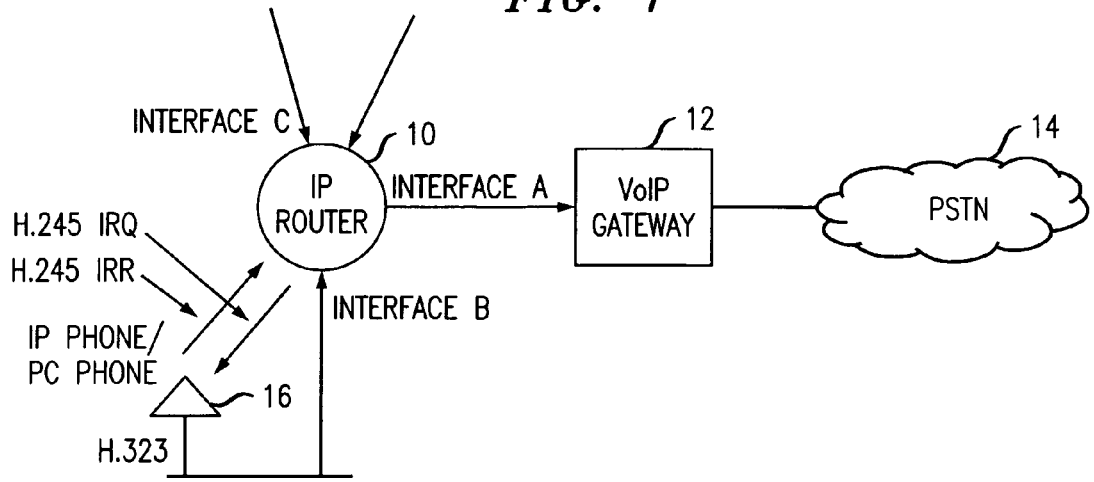
FIG. 1 is an exemplary embodiment of a router in an IP network which makes use of the present invention.

Referring to FIG. 1, one embodiment of an IP router 10 is shown in accordance with the present invention. As can be seen, the router includes a number of interfaces, interfaces A, B, C. Interface A couples to VoIP gateway which in turn couples to the public switched telephone network (PSTN). H.323 gateways 12 provide services to H.323 clients so that they can communicate with non H.323 entities. The most common type of H.323 gateways allow communications between H.323 terminals and telephones on the circuit switched network. The gateway must provide translations between different transmission formats, communications procedures and audio codecs. Interface B couples to one or more endpoint IP phone/PC phone terminal(s) 16, interface B is shown to have a H.323 real time traffic flow to a first endpoint terminal. The endpoint terminal 16 provides real time communications and supports voice communications, and can optionally support video and data communications. The most common H.323 terminals are applications, such as Microsoft's NetMeeting, running on a PC.

In connection with the present invention, the IP router 10 includes software stored in memory (not shown) which enables the router to periodically count or ascertain the number of active connections per interface. The counting is based on TOS, IP Addresses, and TCP/UDP and UDP/IP socket range. When a router receives a new packet carrying a new IP address a connection is able to be identified and the router assigns a priority to the flow based on the TOS (ascertained from the packet header) and/or TCP/UDP socket. For example, if the flow is a non H.323 data query, the router will assign a low priority to the flow in its connection table. However, if the flow is an H.323 real time traffic flow (e.g., VoIP), the flow will be treated differently. A real time flow, for example, VoIP or video will be assigned to the highest priority in the connection table.

The present invention enables maintaining an up to date status of bandwidth allocation through periodic updates of the connection table in the corresponding router. In order to update the connection table, the IP router periodically, e.g., at 10 second intervals, sends an H.323 Info Request (IRQ) status query message to the H.323 endpoints in its connection table. The router will then set the Call Reference Value (Call Ref value) of the IRQ message to 0. The H.323 endpoint will respond with an Info Request Response (IRR) message to inform the router about the status of all of its calls, e.g., active or inactive, the call references of its active calls, and the bandwidth utilized by each call. A table is created and maintained in the router for each interface so that a total of the currently allotted bandwidth may be readily updated and accessed.

Figure 2:
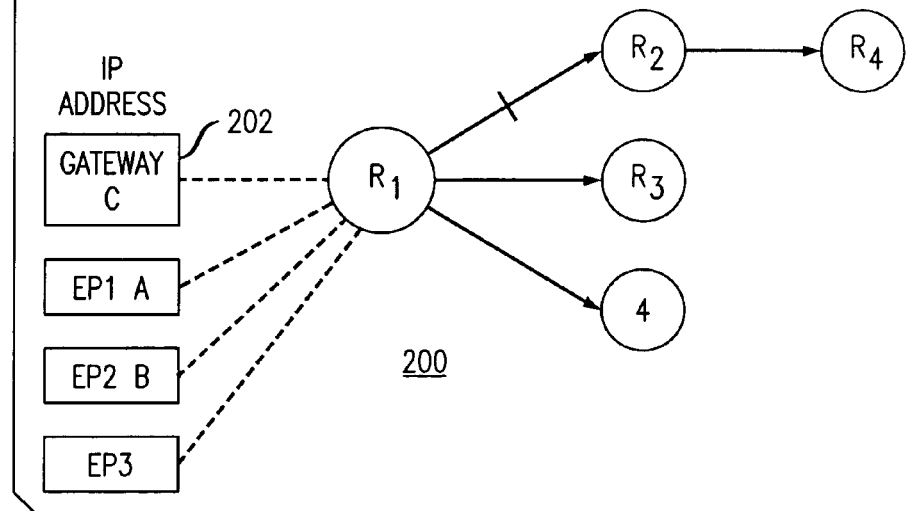
FIG. 2 is an exemplary embodiment of an endpoint connection table for an associated network.

FIG. 2 shows an exemplary embodiment of a router call connection table. In the example shown, Table II, is the table for gateway C and endpoint A, B, and 3 interfaces of router R1 of network 200. Router R1 has interfaces to gateway C, endpoints EP1 A, EP2 B, EP3 and routers R2, R3, and 4. In addition, router R2 has an interface to router R4. The table includes various categories for each connection of a respective interface. As shown, the table includes a category for source IP address, call reference value, utilized bandwidth and connection status. As can be seen from Table II, each call connection of an associated gateway 202 may be tracked separately. In accordance with the present invention, the router may also operate so that queries to the endpoints are made only to the real-time, or otherwise highest priority connections.

For the response part of the query, if the endpoint has no calls active for the specific query, the endpoint will set the Call Ref value of the IRR message to 0 indicating that it has no active calls. In this case, the router will update its table by deleting the entry belonging to the call and decrementing the number of H.323 connections in the connection table. When the number of H.323 calls reaches the maximum, the router will drop packets of any new connections.

When the number of calls or the bandwidth allotment for a router interface reaches its maximum, the router now can do one of two things to inform the endpoint to disconnect the call if the maximum number of calls is reached/exceeded. A first approach is to do nothing and continue dropping packets of new calls. In this approach, the endpoints will realize that they are experiencing 100% packet loss, e.g., by the RTP/RTCP messages interchanged between the endpoints. In this case the higher layers in the terminals will terminate the call because it experiences too much packet loss.

In the second approach, the Router first obtains the Call_Ref value of the new call. The router will then construct a new message using the non-Standard H.245 message format and transmit the message to the endpoint to inform the endpoint to terminate the call. This new message will have the following information:

Name Network Congestion Disconnect (NCD)
Call_Ref xx

Figure 3:
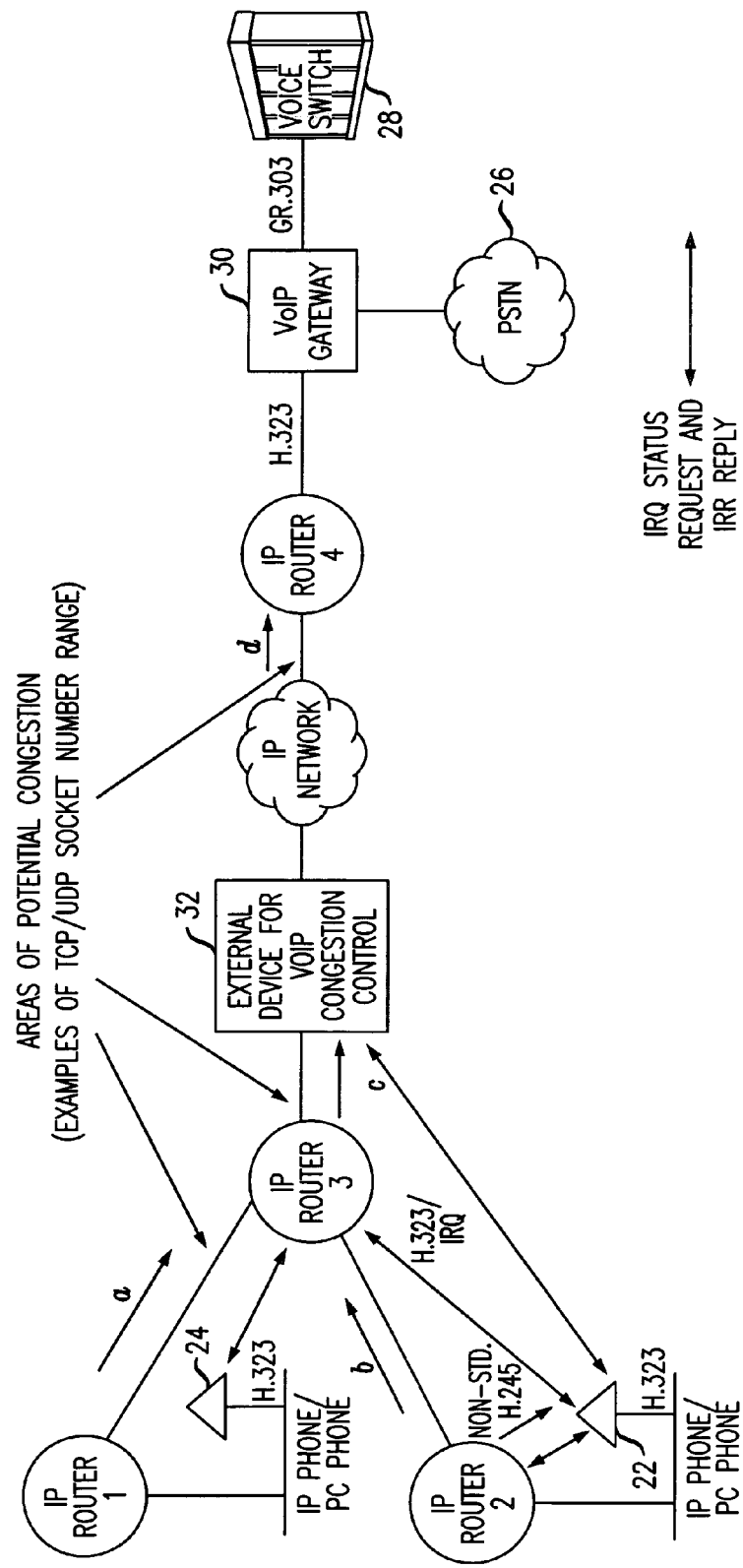
FIG. 3 is an exemplary embodiment of an IP network used in connection with the present invention.

Referring to FIG. 3, there is shown another embodiment of an IP network 20 which utilizes the present invention. As shown, the network 20 includes four routers, IP router 1, 2, 3, 4. Each of the IP routers 1, 2, 3, 4 are part of the overall IP network 20 and may include connections to one or more H.323 endpoints. As shown, router 1 and router 3 couple to a first H.323 endpoint 24, e.g., an IP phone or PC phone, and router 2 and router 3 each couple to a second H.323 endpoint 22. The IP network couples to the PSTN network 26 and voice switches 28 through a VoIP gateway 30 that couples to router 4. In addition, although the endpoints shown in FIGS. 1 and 2 are described as IP or PC phones, it would be understood that the endpoints may also be endpoints with video and/or multimedia capabilities.

Figure 4:
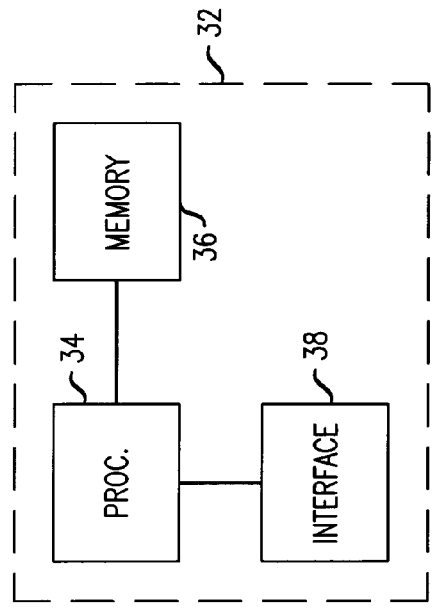
FIG. 4 is an exemplary block diagram of an external monitoring device in accordance with the present invention.

FIG. 3 illustrates that an optional external device 32 can also be responsible for querying the associated endpoints of a router, counting the number of connections and associated bandwidth utilization, and blocking new connections when the maximum capacity is reached, as in the case of the router. The basic structure of the external device 32 is shown in FIG. 4. As shown, the device includes a digital processor 34 and associated memory 36 for storing the count, query and update program for execution by the processor. A communications interface 38 for communicating with the endpoints and corresponding router(s) is also included.

Figure 5:
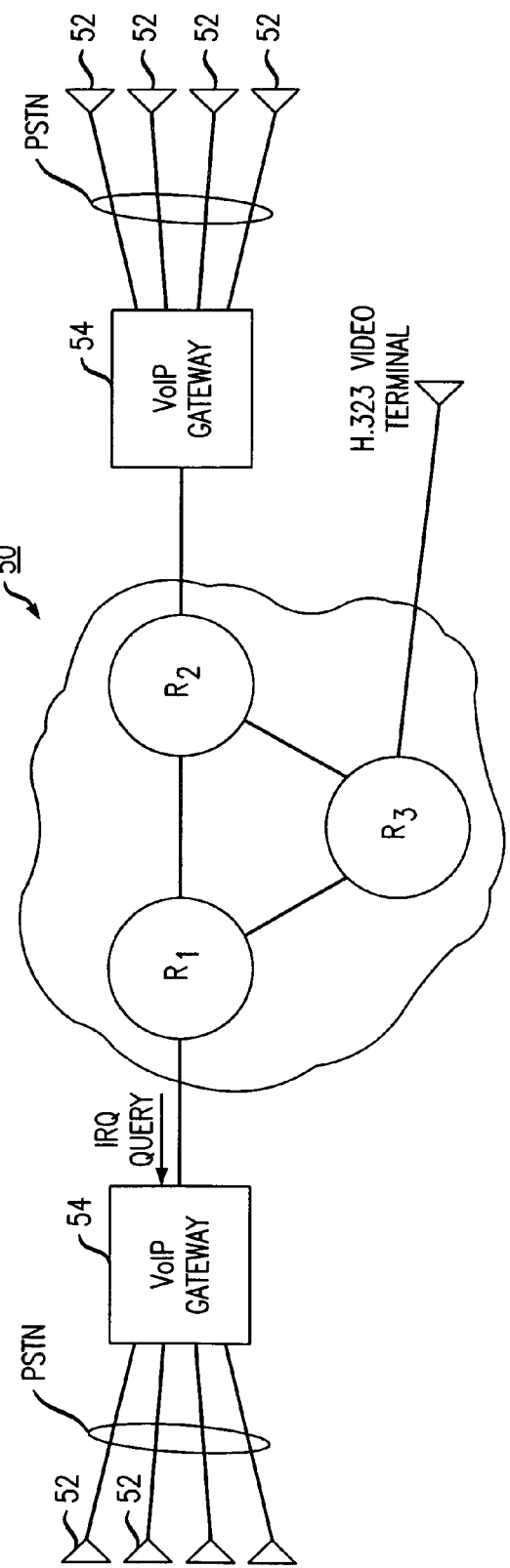
FIG. 5 shows an additional embodiment of an IP network having calls routed through a VoIP gateway.

Referring to FIG. 5, an alternate network configuration 50 having routers R1, R2, R3 for use in connection with the present invention is shown. FIG. 5 illustrates that multiple IP telephone devices 52 can be coupled to an IP network through a single VoIP gateway. With such a configuration, a single IRQ query to gateway 54 will provide information about all of the active calls, together with information about a) the bandwidth and b) the call reference value of each call of the VoIP gateway, or other specific bandwidth which is allocated through the gateway. Such a configuration is extremely efficient, for providing multiple connection information back to the router. Implementation of the present invention is straightforward in that, the IRQ and IRR messages formats, along with a methodology for counting need only be programmed into the routers or corresponding external device.

The present invention advantageously makes use of H.323 query and response messages which are currently available in the H.323 protocol, i.e., IRQ and IRR massages. In the past, the IRQ command has been sent from a network management device or gatekeeper to a terminal requesting status information in the form of an IRR. Thus, the commands have been used in the context of network management tasks, but not in connection with routers for traffic management purposes.

This invention is advantageous in that it provides a mechanism to guarantee QoS in VoIP networks through what is in effect dynamic reservation of bandwidth per call. This, in turn, allows for traffic engineering, e.g., allowing over-subscription of Voice over IP calls in IP networks, and therefore reduces the amount of data links required. Prior to this invention, in order to implement a VoIP network, all data links had to be under-subscribed.

In order to ensure accurate bandwidth allocation statistics, the querying process of the present invention can be periodically reset at predetermined intervals (e.g., every five minutes) or in response to specified events occurring within the network (e.g., router failures or link failures).

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. A method for dropping packets based on a current bandwidth allocation of packetized communications traffic of a router in a network, said method comprising the steps of:
    periodically querying endpoints corresponding to said router to obtain information for use in updating a connection table of said router, wherein said querying is limited to only real-time endpoint connections without querying non-real-time endpoint connections;
    determining, in response to said querying, a current connection status, call reference value (Call_Ref value), and bandwidth utilization information for each of said endpoints;
    calculating, based on said current connection status, said call reference (Call_Ref) value, and said bandwidth utilization information for each of said endpoints, a current bandwidth allocation for a specific type of communications service handled by said router; and
    when bandwidth is not available for said specific type of communications service, (i) dropping packets of any new call received by said router for said service and (ii) informing said endpoints to disconnect said new call.

2. The method of claim 1, wherein said method is performed by said router on a per interface basis.

3. The method of claim 1, further including the step of admitting additional communications traffic to said router when bandwidth for said specific type of communications service is available.

4. The method of claim 1, wherein the router receives from an endpoint the Call_Ref value for a new connection that is not of a type that can be handled and in response thereto a message is sent to the endpoint to terminate the call.

5. The method of claim 1, wherein said querying step includes the step of sending of a H.323 Info Request (IRQ) message, and a response to said querying includes receiving an Info Request Response (IRR) message.

6. The method of claim 3, wherein said step of admitting additional communications traffic includes the step of determining a type of connection to be made as a function of an identified IP addresses, type of service, and respective socket number range.

7. The method of claim 1, wherein said querying step is periodically reset.

8. A method for managing traffic flowing through individual routers of a packet network, said method comprising the steps of:
    reserving a given amount of bandwidth on interfaces of said individual routers for specific types of communications traffic;
    identifying endpoint connections of said interfaces;
    periodically querying said endpoint connections, wherein said querying is limited to only real-time endpoint connections without querying non-real-time endpoint connections;
    receiving responses from said periodic querying to determine a current connection status, call reference value, and bandwidth allocation for each of said endpoints;
    calculating, based on said current connection status, said call reference value, and said bandwidth allocation for each of said endpoint connections, a current bandwidth allocation for an interface of said routers;
    admitting additional communications traffic over an interface for a specific type of communications service when bandwidth is available; and
    when bandwidth is not available for said specific type of communications service, (i) dropping packets of any new call received by said routers for said service and (ii) informing said endpoints to disconnect said new call.

9. The method of claim 8, wherein each of the routers receive from an endpoint the Call_Ref value of a new connection that is not of a type that can be handled and in response thereto a message is sent to the endpoint to terminate the call.

10. The method of claim 9, wherein said message is a non-standard H.245 message.

11. The method of claim 8, wherein said querying step includes the step of sending a H.323 IRQ message, and a response to said querying includes receiving an IRR message.

12. The method of claim 11, wherein said step of admitting additional communications traffic includes the step of determining a type of connection to be made as a function of an identified IP addresses, type of service, and socket number range.

13. The method of claim 8, wherein said network utilizes Internet Protocol.

14. An apparatus for managing traffic flowing through individual routers of a packet network, said routers reserving a given amount of bandwidth on interfaces of said individual routers for specific types of communications traffic, said apparatus comprising:
    means for periodically querying endpoint connections corresponding to said routers to obtain data for use in updating a connection table of said routers, wherein said querying is limited to only real-time endpoint connections without querying non-real-time endpoint connections;
    means for receiving responses from said periodic querying to determine a current connection status, call reference value, and bandwidth for each of said endpoint connections;

means for calculating, based on said current connection status, said call reference value, and said bandwidth for each of said endpoint connections, a current bandwidth allocation for a specific type of communications service handled by said routers;

said routers admitting additional communications traffic for a specific type of communications service when said given amount of bandwidth is available; and when bandwidth is not available for said specific type of communications service, said routers are operable to (i) drop packets of any new call for said service and (ii) inform said endpoint connections to disconnect said new call.

15. The apparatus of claim 14, wherein each of the routers are operable to receive from an endpoint the Call_Ref value of a new connection that is not of a type that can be handled and in response thereto a message is sent to the endpoint to terminate the call.

16. The apparatus claim 15, wherein said message is a non-standard H.245 message.

17. The apparatus of claim 14, wherein said querying includes sending of a H.323 IRQ message, and a response to said querying includes receiving an IRR message.

18. The apparatus claim 14, wherein said apparatus is operable to determine a type of connection to be made as a function of an identified IP addresses, type of service, and socket number range.

19. The apparatus of claim 14, wherein said network utilizes Internet Protocol.

20. The apparatus of claim 14, wherein said querying is performed by said routers on a per interface basis.

* * * * *